United States Patent Office 3,440,230
Patented Apr. 22, 1969

3,440,230
SELF-CONTAINED, CURABLE RESINS PREPARED BY REACTING ORGANIC ISOCYANATES AND EPOXY ALCOHOLS
Richard C. Doss, Bartlesville, Okla., assignor to Phillips Petroleum Company, a corporation of Delaware
No Drawing. Filed May 2, 1966, Ser. No. 546,567
Int. Cl. C08g 30/00
U.S. Cl. 260—77.5                           7 Claims

ABSTRACT OF THE DISCLOSURE

A heat hardenable or curable epoxy resin is obtained from an organic polyisocyanate and an epoxy alcohol. The carbamate thus formed can be rapidly cross-linked to a hard, insoluble material having considerable bonding strength. This is done by heating. The reaction proceeds at room temperature and is ordinarily maintained below about 30° C. A diluent such as benzene, toluene or the like can be employed. It is helpful to maintain an inert atmosphere by, say, passing a current of nitrogen or other inert medium through the reaction vessel. In the example a mixture of 2,4 and 2,6-toluene-diisocyanate and benzene as diluent is reactive of 2,3-epoxy propanol.

---

The invention contemplates in one of its concepts a self-contained heat hardenable or curable epoxy resin obtained from reaction of an organic polyisocyanate and an epoxy alcohol. The latent epoxy resin thus obtained is preeminently useful, even after long periods of storage times, as an adhesive in, say, lamination, as a sealant or in molding or other uses.

There are known epoxy resin producing materials which are dependent upon admixture of components, blending the same and applying the blended components as a continued series of steps because, once admixed, the components commence reaction to form the ultimate hardened resin.

A self-curing, self-contained single product, not requiring admixture of usually sticky components, is highly to be desired.

One of the concepts of the invention relates to the development of a heat curable composition which is a useful adhesive and laminating agent and is made by the reaction of a polyisocyanate and a hydroxyepoxide at low temperature to give a carbamate. Another concept of the invention relates to heating the carbamate to rapidly crosslink it to form a hard, insoluble material having a considerable bonding strength.

The reaction to form the carbamate can be represented by the following:

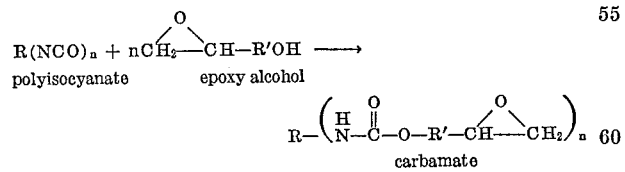

polyisocyanate    epoxy alcohol carbamate in which n is 2, 3, 4, preferably 2, R is an aromatic, paraffinic, cycloparaffinic, olefinic and cycloolefinic radical or combinations thereof such as aromatic substituted paraffinic, aromatic substituted cycloparaffinic and the like radicals with a valence equal to n containing from 3–20 carbon atoms and R' is an alkylene or cycloalkylene radical containing from 1–8 carbon atoms. One of the polyisocyanates is the readily available mixture 2,4-diisocyanatotoluene, 2,6-diisocyanatotoluene, and the epoxy alcohol 2,3-epoxypropanol. Other epoxy alcohols which can be used are:

2,3-epoxy-3-phenylpropanol
3,4-epoxy-2,2-dimethyl-1-butanol
2,3-epoxy-1-cyclobutanol
4,5-epoxy-1-pentanol
5,6-epoxy-1-hexanol
4,5-epoxy-1,1-dimethyl-1-pentanol
2,3-epoxy-1-cyclohexanol Accordingly, it is an object of this invention to provide a self-curing, self-contained product useful as an adhesive, sealant, coating material, etc. Another object of the invention is to provide a method of permanently bonding, sealing, or coating in which there is used a self-curing, self-contained material not requiring admixture of any other material to it prior to use. A further object of the invention is to provide a latent epoxy resin which can be cured simply by heating the same to a temperature at which its mass hardens.

Other concepts, objects, and the several advantages of the invention are apparent from a study of this disclosure and the appended claims.

Thus, according to the present invention, there is provided a self-contained heat curable latent epoxy resin suitable as an adhesive, sealant or the like which is the reaction product obtained when reacting a polyisocyanate and epoxy alcohol as herein described.

Polyisocyanates which are included among those which are contemplated in this invention are:

4,4'-diisocyanatodiphenyl methane
1,6-diisocyanatohexane
1,4-diisocyanato-m-xylene
1,5-diisocyanato-p-xylene
2,4-diisocyanatotoluene
2,6-diisocyanatotoluene
1,4-diisocyanatocyclohexane
1,12-diisocyanatododecane
3,5-diisocyanato-(6-methyl)-cyclohexene
2-phenyl-1,3-diisocyanatopropane
p,p'-diisocyanatobiphenyl
2,6-diisocyanatonaphthalene
1,3,5-triisocyanatobenzene
1,4,7-triisocyanatooctane Epoxy alcohols which are included among those contemplated in this invention are:

2,3-epoxypropanol
2,3-epoxy-3-phenylpropanol
3,4-epoxy-2,2-dimethyl-1-butanol
2,3-epoxy-1-cyclobutanol
4,5-epoxy-1-pentanol
5,6-epoxy-1-hexanol
4,5-epoxy-1,1-dimethyl-1-pentanol
2,3-epoxy-1-cyclohexanol Generally, the reactants suitable to form a composition according to the invention can be determined by mere routine tests.

The reaction is effected suitably in a closed vessel from which air is preferably excluded. The vessel is equipped with agitator means and a cooling means.

The reaction proceeds at room temperature. Preferably the temperature is maintained below about 30° C. The examples herein indicate that the temperature can be in the approximate range 10–30° C. Temperatures below and above the range just given can be employed.

A diluent, e.g., benzene, toluene, etc., can be employed to facilitate the reaction and stirring of the mass during the reaction.

Preferably in the reaction vessel there is maintained an

EXAMPLE I

A 100 ml. resin flask was charged with 17.4 g. (0.1 M.) Nacconite 80 (mixture of 2,4 and 2,6-toluenediisocyanate, 80% 2,4 isomer) and 30 ml. benzene as diluent. The flask was cooled to 15° C. and 14.8 g. (0.2 M.) 2,3-epoxy propanol was added within a few minutes. The contents were stirred with a magnetic stirrer while maintaining a nitrogen stream through the flask. After the addition of the epoxy alcohol had been completed the temperature slowly rose to 27° and the mixture was cooled to maintain a temperature between 25–30° C. A solid consisting of a mixture of n-2,4 and n-2,6-tolylenedicarbamic acid di-(2,3-epoxypropyl) ester separated from the solution. The product was soluble in acetone. After filtering, the product was washed with ethyl ether and dried. Melting point (bar) 120° C.

EXAMPLE II

A 100 ml. resin flask was charged with 14.8 g. (0.2 M.) 2,3-epoxy propanol and 40 ml. benzene as diluent. 17.4 g. (0.1 M.) of 2,4 and 2,6-toluenediisocyanate mixture was slowly added to the flask (about 30 minutes) with stirring at 10–15° C. Stirring was continued while the flask was allowed to come to room temperature. The solution solidified in about 2 hours and the mixture was suction filtered and the residue (A) air dried for 3 days. The diluent or solvent was evaporated from the filtrate and additional solid (B) was recovered. The two recovered solids were dried in a vacuum desiccator.

*Analysis.*—Calc. for N-tolylene dicarbamic acid di(2,3-epoxypropyl)ester

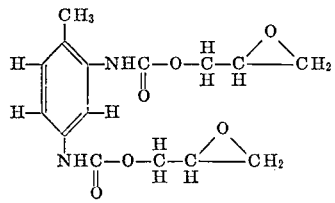

2,4 isomer.

Calc. for C, 55.9%; H, 5.6%. Found Sample A C, 57.2%; H, 5.9%. Found Sample B C, 55.1%; H, 6.6%. Epoxy equivalent 0.622, 0.331, 0.54, eq./100 g.

Both Samples A and B can be heat cured to polymers at 180° in 3 minutes. At 250° C. both flow and cure to a solid in 30 seconds.

Adhesive test

A portion of Sample A from Example II was distributed between two precleaned aluminum strips. The sandwich was heated to 180° C. in a heater press for 30 minutes. The two strips were bonded to each other and exhibited a "lap shear" strength of 700 p.s.i. (ASTM D1002–53T).

The usefulness of the product of the invention might be explained by the fact that the condensation compound retains the epoxide group to a large extent and still has at least one active amino hydrogen capable of reacting with it to effect the crosslinking reaction which takes place at the higher temperature. The condensation product is stable at room temperature. Samples of the carbamate have been stored unchanged for over a month and no inhibitor was used. The cure rate is sufficient to permit use of the product without added initiators or accelerators.

Thus, instead of batch mixing two or more ingredients of varying consistency to formulate an effective adhesive, a self-contained, constant composition has been made available.

Reasonable variation and modification are possible within the scope of the foregoing disclosure and the appended claims to the invention, the essence of which is that there has been provided the reaction of an organic polyisocyanate and an epoxy alcohol to form a carbamate and a self-contained, self-curing (when heated), i.e., latent, epoxy resin.

I claim:

1. A self-contained, heat curable resin composition having the formula

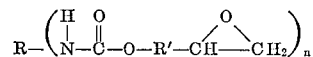

wherein $n$ is an integer in the range of 2 to 4, R is at least one radical selected from the group consisting of aromatic, paraffinic, cycloparaffinic, olefinic, cycloolefinic, and combinations thereof having a valence equal to $n$ and containing from 3 to 20 carbon atoms, and R′ is a radical selected from the group consisting of alkylene and cycloalkylene having from 1 to 8 carbon atoms, said composition having been prepared by reacting an organic polyisocyanate and at least $n$ moles of an epoxy alcohol, the organic polyisocyanate having the formula $R(NCO)_n$ and said epoxy alcohol having the formula

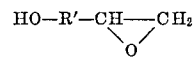

R and R′ being defined as before.

2. A heat curable resin composition according to claim 1 obtained as the reaction product of at least one of
 4,4′-diisocyanatodiphenyl methane
 1,6-diisocyanatohexane
 1,4-diisocyanato-m-xylene
 1,5-diisocyanato-p-xylene
 2,4-diisocyanatotoluene
 2,6-diisocyanatotoluene
 1,4-diisocyanatocyclohexane
 1,12-diisocyanatododecane
 3,5-diisocyanato-(6-methyl)-cyclohexene
 2-phenyl-1,3-diisocyanatopropane
 2,6-diisocyanatonaphthalene
 1,3,5-triisocyanatobenzene
 1,4,7-triisocyanatooctane
 p,p′-diisocyanatobiphenyl
and at least one epoxy alcohol selected from the following:
 2,3-epoxy-3-phenylpropanol
 3,4-epoxy-2,2-dimethyl-1-butanol
 2,3-epoxy-1-cyclobutanol
 4,5-epoxy-1-pentanol
 5,6-epoxy-1-hexanol
 4,5-epoxy-1,1-dimethyl-1-pentanol
 2,3-epoxy-1-cyclohexanol.

3. A heat curable resin composition, according to claim 1, comprising the reaction product of at least one of 2,4- and 2,6-diisocyanatotoluenes and 2,3-epoxypropanol.

4. A latent epoxy resin reaction product, according to claim 1, which upon heating will cure by further reaction by itself, which has the unit structural formula prior to heating to cure the same

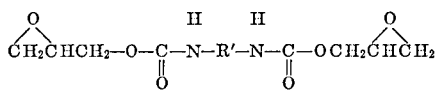

5. A heat curable resin composition according to claim 1 wherein at least one polyisocyanate is reacted with at least one epoxy alcohol at a temperature maintained in the approximaate range 10–30° C. by cooling the reacting mass.

6. A heat curable resin composition according to claim 1 wherein the reaction is conducted by adding the epoxy alcohol to the polyisocyanate, with stirring, in the absence of air and with cooling to maintain the temperature below approximately 30° C.

7. A heat curable resin composition according to claim 1 wherein the temperature of the reaction is maintained below approximately 30° C., a diluent is employed and the epoxy alcohol is added to the polyisocyanate with stirring and while the reacting mass is maintained in an inert atmosphere.

References Cited

UNITED STATES PATENTS

| 2,830,038 | 4/1958 | Pattison | 260—77.5 |
| 3,010,940 | 11/1961 | Charlton et al. | 260—47 |
| 3,020,262 | 2/1962 | Speranza | 260—47 |
| 3,025,160 | 3/1962 | Bunge et al. | 260—77.5 |
| 3,042,692 | 7/1962 | Findley | 260—404.5 |
| 3,316,220 | 4/1967 | Ramos | 260—77.5 |
| 3,317,471 | 5/1967 | Johnson et al. | 260—47 |

FOREIGN PATENTS 1,045,804  10/1966  Great Britain.

DONALD E. CZAJA, *Primary Examiner.*

M. J. WELSH, *Assistant Examiner.*

U.S. Cl. X.R.

260—348